2,905,268

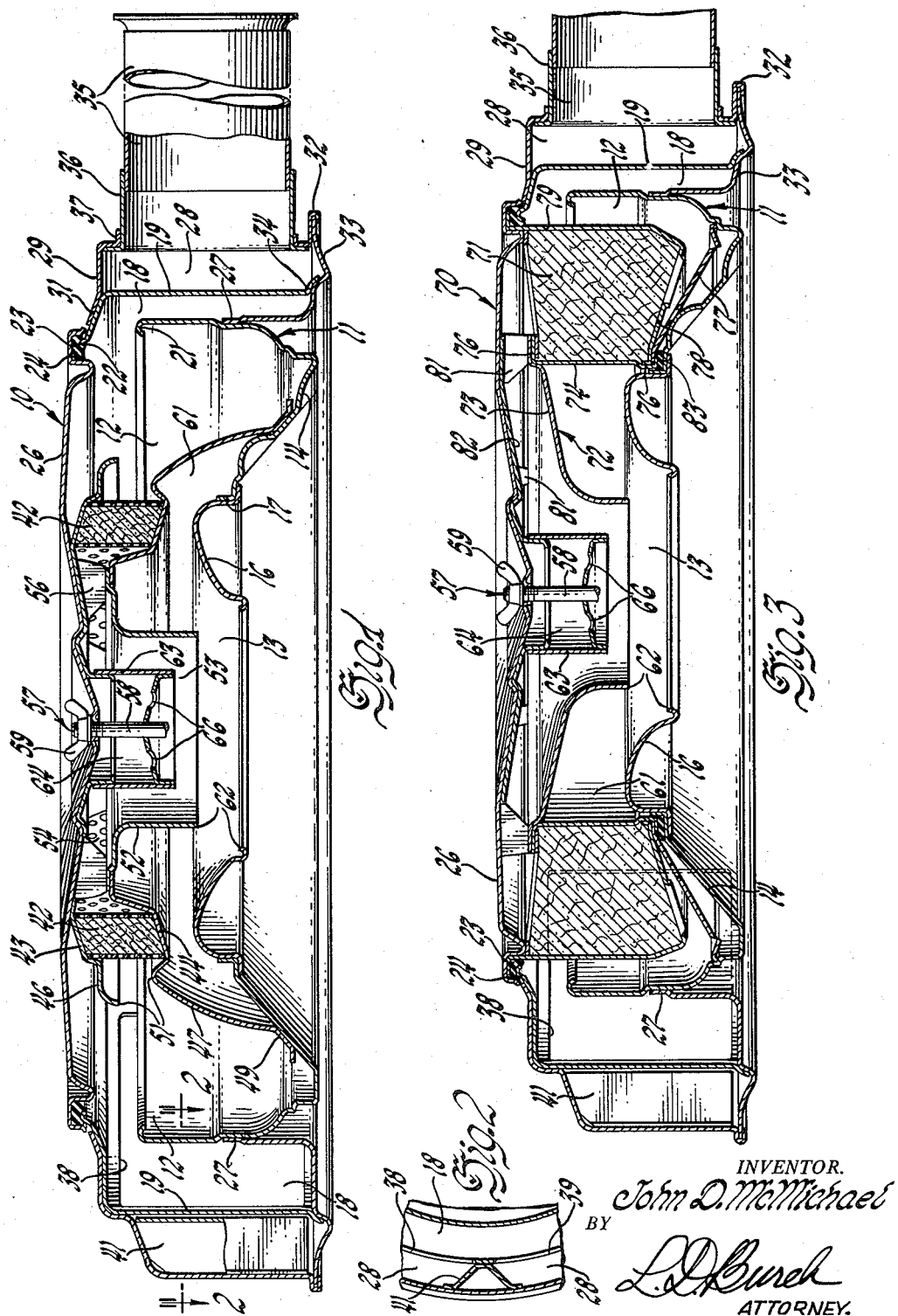

CLEANER SILENCER ASSEMBLY

John D. McMichael, Swartz Creek, Mich., assignor to General Motors Corporation, Detroit, Mich., a corporation of Delaware Application October 29, 1956, Serial No. 618,843

2 Claims. (Cl. 183—44)

This invention relates to cleaner silencer assemblies for automotive and other uses and has particular relation to cleaner silencer assemblies especially applicable for use with V-type engines employed in modern passenger automobiles where space is at a premium, where cost must be low and where efficiency of operation must be great.

It is proposed to provide a cleaner silencer assembly which will meet these requirements as will hereinafter become apparent.

In the drawing:

Figure 1 is a cross section view of a cleaner silencer assembly embodying the principles of the invention.

Figure 2 is a fragmentary cross sectional view taken substantially in the plane of line 2—2 of Figure 1.

Figure 3 is a vertical sectional view through a modified form of the cleaner silencer assembly illustrated by Figures 1 and 2.

The cleaner silencer assembly 10, as illustrated by Figures 1 and 2, is formed to provide a supporting wall 11 in which an annular filter chamber 12 is formed outwardly of a centrally disposed outlet 13. The wall 11 may be formed, if desired, by providing annular wall sections 14 and 16 secured together at 17. The filter chamber 12 and the outlet 13 open through the wall 11 in opposite directions. An inlet chamber 18 is formed outwardly of the filter chamber 12 by a wall 19 surrounding the outer part of the wall 11. The inlet chamber 18 communicates with the filter chamber 12 around the beaded edge 21 of the wall 11. The beaded edge 22 of the wall 19 is adapted to be engaged by a gasket 23 formed in a channel 24 extending around the outer edge of a cover 26 which extends over the filter chamber 12 and the outlet 13. The opposite edge of the wall 19 may be secured to the wall 11 outwardly of the filter chamber 12 by a lap seam indicated at 27. Outwardly of the inlet chamber 18 is an inlet passage 28 which is formed by a wall 29 extending around the wall 19 and secured thereto at one edge as is indicated at 31. The opposite edge of the wall 29 may be formed to provide a bead 32 engaging the outer peripheral edge of an annular lower wall 33. The lower wall 33 forms a part of the outer wall 29 of the inlet passage 28 and a part of the wall 19 which engages the wall 11 at 27. The outer part of the wall 19 may be secured to an intermediate part of the wall 33 by a seam indicated at 34. The inlet passage 28 may be supplied with air at one side of the assembly 10 by a conduit or tube 36 forming an inlet 35 extending outwardly from the assembly 10. The tube or conduit may be secured in an opening in the wall 29 by flange means indicated at 37.

The inlet passage 28 is an annular passage which extends in opposite directions around the wall 19 from the inlet 35. Directly opposite the inlet 35 the wall 19 may be provided with openings 38 and 39 which provide communication between the part of the inlet passage opposite the inlet 35 and the inlet chamber 18. It will be noted from Figure 1 that the part of the inlet chamber 18 which communcates with the openings 38 and 39 is wider than the part of the inlet adjacent the inlet 35 to provide a uniform distribution of air from the inlet chamber 18 to the filter chamber 12. A partition wall 41 is formed across the inlet passage 28 between the openings 38 and 39 to direct the air from the different branches of the passage 28 inwardly through the openings 38 and 39. The filter means 42 is disposed in the inlet chamber 12 between the inlet passage 18 and the outlet 13 for filtering the air supplied to the chamber 12. The filter means 42 may be secured between the cover 12 and the supporting wall 11 in any suitable manner. As shown by Figure 1 the filter means 42 is secured between annular abutment means 43 and 44 formed on baffle walls 46 and 47, respectively. The baffle wall 46 may be secured to the central part of the cover 26 in any suitable manner. The baffle wall 47 is adapted to be secured to and supported by the wall 11 at the outer peripheral edge thereof as is indicated at 49. The parts of the baffle walls 46 and 47 disposed outwardly of the abutment means 43 and 44 supporting the filter means 42 may be spaced uniformly from one another to provide a filter inlet 51 for equally distributing the air in the filter chamber 12 to the filter means 42. Beyond the abutment means 44 the baffle wall 47 extends downwardly at 52 and toward the outlet 13 to provide an outlet passage 53 extending toward the outlet 13. The part of the baffle walls 46 and beyond the filter means 42 are spaced to provide an outlet chamber 54 leading to the outlet passage 53 and the outlet 13. Abutment means also is formed within the outlet chamber 42 by spacers 56 that are struck out from openings in the baffle wall 46 and that extend across the outlet chamber 54 to engage the baffle wall 47 adjacent the outlet 53. The cover 26 is held in position on the bead 22 in any suitable manner as by fastening means 57 in the form of a bolt 58 and a wing nut 59. The bolt may be secured in the carburetor or other intake device of the engine with which the cleaner silencer assembly 10 may be employed. Inwardly of the seam 49 the baffle 47 is spaced from the wall 11 to provide a resonating chamber 61 which is acoustically coupled to the outlet 13 by an annular opening 62 formed between the end of the tubular extension 52 of the wall 47 and opening in the wall 11 in which the outlet 13 is formed. Also formed within the outlet chamber 54 and extending concentrically within the tubular extension 52 is cylindrical wall means 63 projecting from the cover 26 and forming a resonating chamber 64 which is acoustically coupled to the outlet 13 by openings 66. Certain sound waves emanating from the engine and into the outlet 13 will be attenuated in the resonating chambers 61 and 64. The sound waves not so attenuated will be effected by the impedance of the relatively constricted passage formed by the outlet 53 around the wall means 63, by the relatively shallow distribution chamber 54, by the fibrous structure of the filter means 42 and by the filter inlet 51. Thereafter sound waves will be further attenuated by the capacitance of the filter chamber 12 outwardly of the inlet 51 and the inlet chamber 18 and by the impedance of the two branches of the inlet passage 28 and the inlet 35.

The cleaner silencer assembly 70 disclosed by Figure 3 is similar to that disclosed by Figures 1 and 2 except for variations involved in the use of oil bath type filter means indicated at 71. The parts of the Figure 3 structure that are the same as those in the Figure 1 structure are indicated by the same reference numerals. In the Figure 3 structure the baffle wall 72 which corresponds to the baffle wall 47 in Figure 1 is made in two parts indicated at 73 and 74 which are secured together at the seam indicated at 76. The part 74 forms the inside wall for the filter means 71. The lower flanged edge of the part 74 is secured by a seam 76 to the adjacent edge of the oil control baffle 77 and the perforated lower wall 78 of the filter means 71. The outer side wall 79 of the filter means 71 is secured in the channel 24 of the cover 26 inwardly of the gasket means 23. The spacing and the abutment means 81 is formed at the outer end of wall means 82 which is similiar to the baffle wall 46 embodied in the Figure 1 structure. The abutment or spacer means 81 engages the wall 72 at the seam 76 and secures the filter means 71 in position upon the wall 11 when the fastening means 58 is engaged. A gasket 83 may be employed between the walls 72 and 11 at the seam 76.

The operation of the structure disclosed by Figure 3 is similar to the operation of the Figure 1 structure as previously described.

I claim:

1. A cleaner silencer assembly comprising a supporting wall having an inner part and an outer part, said outer part forming an annular filter chamber in one side of said supporting wall, said inner part forming an outlet leading from said annular filter chamber through the central part of said supporting wall, an annular lower wall secured to the outer part of said supporting wall and having parts extending downwardly and outwardly from the lower part of said filter chamber, an annular intermediate wall disposed outwardly of said filter chamber and being secured to said outwardly extending part of said lower wall to provide an inlet chamber communicating with said filter chamber around the upper edge of said outer part of said supporting wall, an annular outer wall secured at the opposite edges thereof to the outer extremity of said lower wall and to the upper extremity of said intermediate wall and providing inlet passage means around said inlet chamber, inlet conduit means secured to one side of said outer wall and communicating with said inlet passage means, and inlet opening means in said intermediate wall and on the side thereof opposite said inlet conduit means and providing communication between said inlet passage means and said inlet chamber means, annular filter means in said filter chamber, and a cover for said inlet chamber and said annular filter means, said cover being adapted to extend across said filter chamber and said inlet chamber between the edges of said upper extremity of said intermediate wall of said assembly.

2. A cleaner silencer assembly as defined by claim 1 and in which said inlet chamber varies in width across said assembly from a wider part adjacent said inlet opening means to a narrower part adjacent said inlet conduit means.

References Cited in the file of this patent

UNITED STATES PATENTS

| 2,789,662 | McMullen | Apr. 23, 1957 |
| 2,822,885 | Sebok et al. | Feb. 11, 1958 |

FOREIGN PATENTS

| 725,363 | Great Britain | Mar. 2, 1955 |
| 756,640 | Great Britain | Sept. 5, 1956 |
| 1,109,454 | France | Sept. 28, 1955 |
| 869,710 | Germany | Mar. 5, 1953 |